US009689436B2

(12) United States Patent
Sato et al.

(10) Patent No.: US 9,689,436 B2
(45) Date of Patent: Jun. 27, 2017

(54) TORQUE LIMITER

(71) Applicant: Miki Pulley Co., Ltd., Kanagawa (JP)

(72) Inventors: Katsuhiko Sato, Sagamihara (JP); Tomio Watanabe, Sagamihara (JP)

(73) Assignee: Miki Pulley Co., Ltd., Kanagawa (JP)

( * ) Notice: Subject to any disclaimer, the term of this patent is extended or adjusted under 35 U.S.C. 154(b) by 0 days.

(21) Appl. No.: 15/036,857

(22) PCT Filed: Nov. 5, 2014

(86) PCT No.: PCT/JP2014/005551
§ 371 (c)(1),
(2) Date: May 16, 2016

(87) PCT Pub. No.: WO2015/075879
PCT Pub. Date: May 28, 2015

(65) Prior Publication Data
US 2016/0327100 A1    Nov. 10, 2016

(30) Foreign Application Priority Data

Nov. 21, 2013  (JP) .................................. 2013-240758

(51) Int. Cl.
*F16D 43/208*    (2006.01)
*F16D 7/10*    (2006.01)

(52) U.S. Cl.
CPC ............ *F16D 7/10* (2013.01); *F16D 43/208* (2013.01)

(58) Field of Classification Search
CPC . F16D 3/007; F16D 3/048; F16D 3/10; F16D 11/16; F16D 43/2028; F16D 43/208; F16D 7/007; F16D 7/048; F16D 7/10

USPC .......................................... 464/10, 30, 34, 37
See application file for complete search history.

(56) References Cited

U.S. PATENT DOCUMENTS

| | | | |
|---|---|---|---|
| 1,443,026 A | | 1/1923 | Lee |
| 2,028,441 A | * | 1/1936 | Decker ................. B25B 23/141 |
| | | | 464/37 |
| 2,326,611 A | | 8/1943 | Bossmeyer et al. |
| 3,724,815 A | * | 4/1973 | Hawkins .................. B66D 3/00 |
| | | | 464/37 |
| 5,577,347 A | | 11/1996 | Heckel et al. |
| 2009/0305794 A1 | * | 12/2009 | Long, Jr. ................. F16D 7/048 |
| | | | 464/48 |

FOREIGN PATENT DOCUMENTS

| | | | | |
|---|---|---|---|---|
| DE | 19929833 A1 | * | 1/2001 | ............... F16D 7/10 |
| FR | 346627 A | * | 2/1905 | ............... F16D 7/10 |
| GB | 370977 A | * | 4/1932 | ............. F16D 7/048 |
| GB | 2265191 A | * | 9/1993 | ........... F16D 43/208 |
| JP | 61-87229 U | | 6/1986 | |

(Continued)

OTHER PUBLICATIONS

International Search Report PCT/JP2014/005551, Filed Jan. 29, 2015. (2 pages).

*Primary Examiner* — Josh Skroupa
(74) *Attorney, Agent, or Firm* — Dority & Manning, P.A.

(57) ABSTRACT

In one aspect, a torque limiter may include a roller provided on one end of a lever member that selectively engages an engagement recess. The other end of the lever member is connected to an end of a tension spring to urge the lever member in the direction to engage the one end of the lever member in the engagement recess.

7 Claims, 3 Drawing Sheets

(56) References Cited

FOREIGN PATENT DOCUMENTS

| JP | 6-235276 | 8/1994 | | |
|----|----------|--------|---|---|
| JP | 0719257 | 1/1995 | | |
| JP | 2000199530 | 7/2000 | | |
| JP | 2009090451 | 4/2009 | | |
| WO | WO 2011054807 A1 * | 5/2011 | ............ | F16D 7/048 |

* cited by examiner

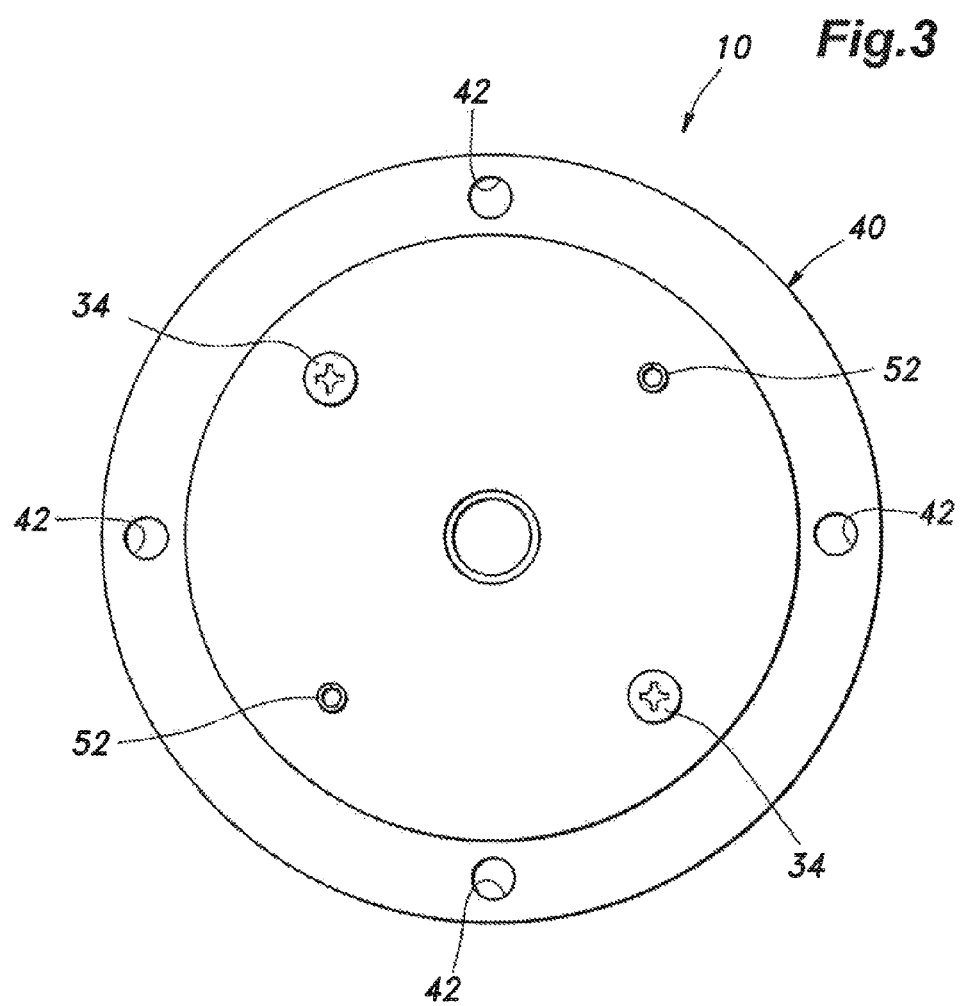

TORQUE LIMITER

CROSS REFERENCE TO RELATED APPLICATIONS

This application is the U.S. National Stage entry of International Application Number PCT/JP2014/005551 filed under the Patent Cooperation Treaty having a filing date of Nov. 5, 2014, which claims priority to Japanese Patent Application Serial Number 2013-240758 having a filing date of Nov. 21, 2013, the disclosures of both of which are hereby incorporated by reference herein in their entirety for all purposes.

The present invention relates to a torque limiter, and in particular to a torque limiter using a spring.

BACKGROUND OF THE INVENTION

Some of the known torque limiters for transmitting a torque of a limited value between a first rotatable member and a second rotatable member disposed in a coaxial relationship use a spring. In a typical torque limiter of this type, the first rotatable member is formed with an engagement recess in an inner peripheral part thereof, and the second rotatable member is provided with a roller and a spring for urging the roller into engagement with the engagement recess. The maximum value of the torque (torque limit value) that can be transmitted between the first rotatable member and the second rotatable member is determined by the spring force which the spring applies to the roller. See Patent Documents 1 and 2, for instance.

In another typical torque limiter using a spring, the first rotatable member is formed with an engagement recess in an outer peripheral part thereof, and the second rotatable member is provided with an arm having a free end configured to be selectively engaged by the engagement recess and a spring for urging the arm into engagement with the engagement recess. The maximum value of the torque that can be transmitted between the first rotatable member and the second rotatable member is determined by the spring force which the spring applies to the arm. See Patent Document 3, for instance.

PRIOR ART DOCUMENT(S)

Patent Document(s)

Patent Document 1: JPH07-19257A
Patent Document 2: JP2009-90451A
Patent Document 3: JPS61-87229U

SUMMARY OF THE INVENTION

Task to be Accomplished by the Invention

In the torque limiters disclosed in Patent Documents 1 and 2, the torque limit value or the prescribed torque value is determined by the preloading of the spring and the configuration of the engagement recess so that there is very little freedom in selecting the prescribed torque value. In the torque limiter disclosed in Patent Document 3, the prescribed torque value can be varied by changing the point on the arm at which the spring is engaged. However, an end of the arm is pivotally attached to the second rotatable member, and very little lever action is utilized so that the changing the arm length does not cause any significant change in the prescribed torque value.

A primary object of the present invention is to provide a torque limiter that allows the prescribed torque value to be freely selected.

Means to Accomplish the Task

The present invention provides a torque limiter (10) for transmitting a torque of a limited value between a first rotatable member (40) and a second rotatable member (20, 30) disposed on a common central axial line, comprising an engagement recess (44) formed in an inner peripheral part of the first rotatable member (40), a lever member (54) having an intermediate part pivotally attached to the second rotatable member (20, 30) about a rotational center line extending in parallel with the central axial line of the second rotatable member (20, 30) and one end configured to selectively engage the engagement recess (44), and a tension spring (62) having an end engaged by the second rotatable member (20, 30) and another end engaged by another end of the lever member (54), the tension spring (62) urging the lever member (54) in a direction to cause the one end of the lever member (54) to engage the engagement recess (44).

According to this arrangement, the prescribed torque value of the torque limiter (10) is determined by the lever ratio of the lever member (54), in addition to the preload of the tension spring (62) and the configuration of the engagement recess (44) so that a high level of freedom is attained in determining the prescribed torque value.

In the torque limiter of the present invention, preferably, the lever member (54) consists of a bell crank (54).

The bell crank (54) provides an action of changing the direction of the applied force in addition to the lever action so that the freedom in the positioning of the tension spring (62) is enhanced by suitably changing the bend angle of the bell crank (54), and the torque limiter (10) can be designed as a highly compact unit.

In the torque limiter of the present invention, preferably, a roller (58) is provided on a end of the lever member (54) in a rotatable manner about an axial line parallel to the central axial line of the second rotatable member (20, 30) so that the end of the lever member (54) may be selectively engaged by the engagement recess (44) via the roller (58).

According to this arrangement, the end of the lever member (54) selectively engages the engagement recess (44) via the rotational (rolling) movement of the roller (58) so that the engagement occurs in a smooth and reliable manner without being caught or otherwise involving any instability.

In the torque limiter of the present invention, preferably, the engagement recess (44) is provided with a moderate slope (44A) on one circumferential side and a steep slope (44B) on another circumferential side.

Thereby, the prescribed torque value may be set as different values depending on the rotational direction, or a torque limiting action may be produced only in one direction of the rotation (or only in the normal rotation).

In the torque limiter of the present invention, preferably, an assembly consisting of the engagement recess (44), the lever member (54) and the tension spring (62) is provided in each of a plurality of rotationally symmetric positions about the central axial line of the first and second rotatable members.

According to this arrangement, the torque limiter (10) is not subjected to a radially offset loading so that an uneven wear in a rotation supporting part can be avoided.

In the torque limiter of the present invention, preferably, the assembly is provided in each of two rotationally symmetric positions about the central axial line of the first and second rotatable members (40, 20, 30), and the tension springs (62) of the two assemblies extend in parallel to each other on either side of the axial center line of the first and second rotatable members (40, 20, 30).

According to this arrangement, because the two tension springs (62) extend in parallel to each other on either side of the axial center line of the first and second rotatable members (40, 20, 30), the two tension springs (62) can be arranged in a space efficient manner so that the torque limiter (10) can be designed as a highly compact unit.

In the torque limiter of the present invention, preferably, the lever member (54) is provided with a spring engaging feature (64) for engaging the other end of the tension spring (62), the spring engaging feature (64) including a plurality of spring engagement portions arranged along a lengthwise direction of the lever member (54) so that the other end of the tension spring (62) may be engaged to a selected one of the spring engagement portions.

According to this arrangement, by allowing the spring engagement portion for engaging the other end of the tension spring (62) to be selected so that an additional mode of selecting the prescribed tension value of the torque limiter (10) is provided, and the freedom in selecting the prescribed torque value is enhanced.

According to a preferred embodiment of the present invention, the first rotatable member comprises an outer annular member (40), and the second rotatable member comprises an assembly of a hub member (20) and a disk-shaped inner member (30), and the outer annular member (40) is interposed between the hub member (20) and an end plate (32) attached to the hub member on an opposite side of the inner member (30) so that the outer annular member (40) is rotatable relative to the inner member (30) via a rotational guide defined by an outer peripheral part of the inner member (30).

Thereby, a reliable operation of the torque limiter can be ensured by using a highly simple structure.

Effect of the Invention

According to the torque limiter of the present invention, the prescribed torque value of the torque limiter is determined by the lever ratio of the lever member in addition to the preloading of the spring and the configuration of the engagement recess so that a high level of freedom can be attained in setting the prescribed limit value.

BRIEF DESCRIPTION OF THE DRAWINGS

FIG. 3 is a front view of the torque limiter (as seen in the direction indicated by arrow A in FIG. 2).

DETAILED DESCRIPTION OF THE INVENTION

Figure 1:
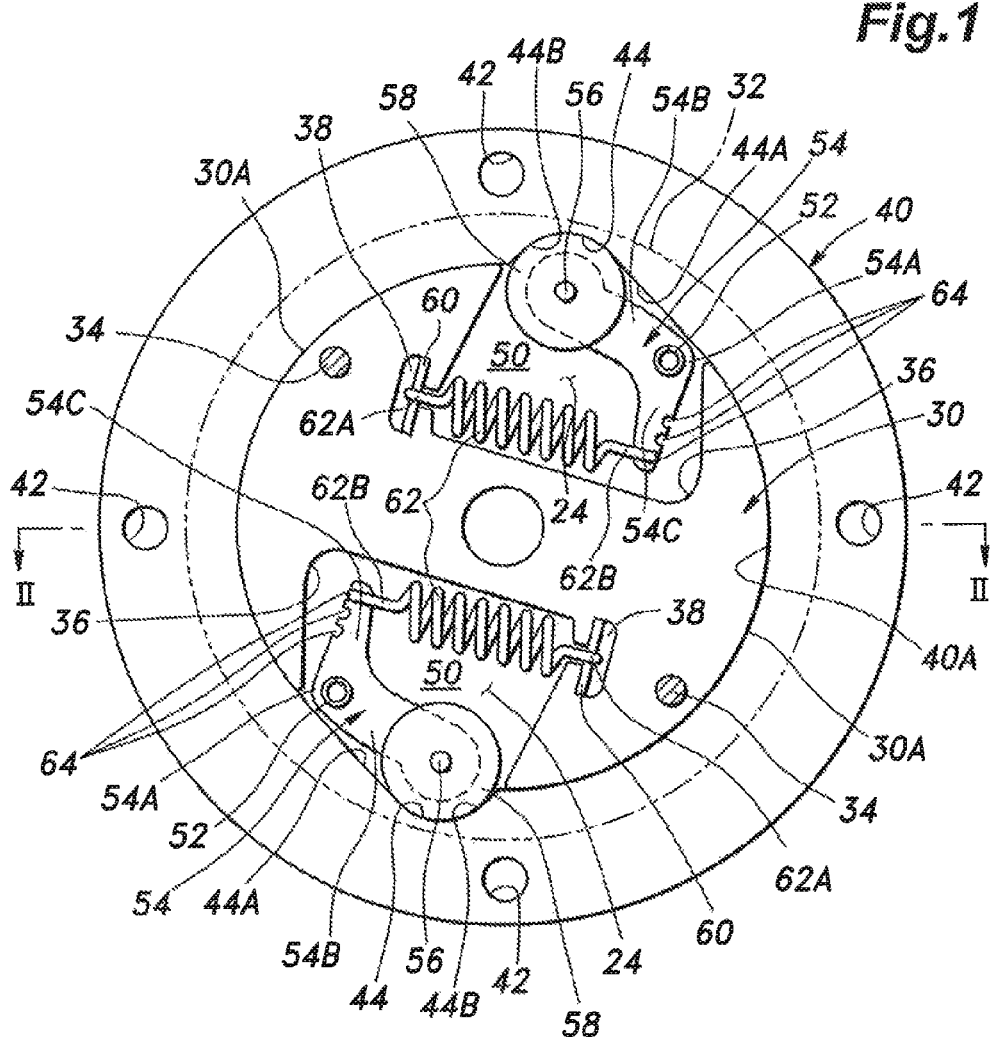
FIG. 1 is a front view of an essential part of a torque limiter embodying the present invention (with an end plate removed)

Now the present invention is described in the following with reference to FIGS. 1 to 3.

The torque limiter 10 comprises a first rotatable member consisting of an outer annular member 40 and a second rotatable member consisting of an assembly of a hub member 20 and an inner member 30, the first rotatable member and the second rotatable member being disposed on a common axial central line.

The hub member 20 is made of metallic material such as aluminum, and includes a boss 22 and a radial flange 24 integrally provided on an axial end of the boss 22 and having a greater outer diameter than the boss 22. A shaft receiving bore 26 having a key slot is passed centrally through the boss 22 in the axial direction. The boss 22 is further provided with a threaded hole 28 passed radially through the boss 22 for threadably receiving a set screw.

The inner member 30 is made of a metallic plate member in the form of a disk having a substantial thickness, and fixedly secured to an end surface of the flange 24 by screws 34. The screws 34 are also passed through an end plate 32 which is made of a circular metallic plate having a greater outer diameter than the inner member 30, and fixedly secured to the end surface of the inner member 30 facing away from the flange 24. The outer diameter of the end plate 32 is equal to that of the flange 24.

A pair of substantially rectangular cutouts 36 are formed in the inner member 30 at respective rotationally symmetric positions about the central axial line of the inner member 30 or at diametrically opposing positions which are angularly displaced by 180 degrees about the central axial line, and each cutout 36 opens out at the outer periphery of the inner member 30. The remaining outer circumferential surface 30A of the inner member 30 except for the parts where the cutouts 36 are located extend each (as an arcuate surface) over a prescribed angular range at the respective rotationally symmetric positions about the central axial line of the inner member 30.

The outer annular member 40 is made of metallic or plastic material, and has an inner circumferential surface 40A which slidably receives the outer circumferential surface 30A of the inner member 30 so as to serve as a sliding guide that rotatably supports the outer circumferential surface 30A of the inner member 30 about the central axial line. The outer annular member 40 is axially retained to the outer periphery of the inner member 30 by being interposed axially between the flange 24 and the end plate 32. The outer annular member 40 is provided with a plurality of bolt receiving holes 42 consisting of through holes for receiving bolts (not shown in the drawings) for connecting the outer annular member 40 to a torque user or a torque source.

Each cutout 36 defines an enclosed chamber 50 in cooperation with the flange 24, the end plate 32 and the outer annular member 40. A pair of engagement recesses 44 are formed in the inner peripheral parts of the outer annular member 40 that correspond to the cutouts 36, respectively. Each of the engagement recesses 44 is provided with a moderate slope 44A on an advance side (first circumferential direction) and a steep slope 44B on the opposite delay side (second circumferential direction) with respect to the clockwise rotation of the outer annular member 40 in FIG. 1. The two engagement recesses 44 are rotationally symmetric about the central axial line. More specifically, each steep slope 44B consists of an arcuate surface having an inner diameter equal in size to the outer diameter of a roller 58 which will be described hereinafter, and each moderate slope 44A consists of a linear slope extending from the bottom surface of the corresponding engagement recess 44 to the inner circumferential surface 40A of the outer annular member 40 (the inner circumferential surface excluding the corresponding engagement recess 44).

A spring pin 52 is axially passed through each chamber 50, and the two ends of the spring pin 52 are engaged by the flange 24 and the end plate 32, respectively. Each spring pin 52 consists of a fixed shaft which pivotally supports an intermediate part 54A of a bell crank 54 made of metallic material in the chamber 50 about the central axial line of the spring pin 52. Each bell crank 54 positioned in the corresponding chamber 50 is provided with a first arm section 54B extending from the intermediate part 54A in the tangential direction of the outer annular member 40, and a second arm section 54C extending from the intermediate part 54A substantially in the radial direction of the outer annular member 40, and mounted on the flange 24 and the end plate 32 at the intermediate part 54A thereof consisting of a bent part so as to be rotatable about an axial line parallel to the central axial line of the hub member 20.

A roller 58 made of plastic material is pivotally attached to the free end of the first arm section 54B of the bell crank 54 via a pin 56. The roller 58 selectively engages the corresponding engagement recess 44 as the bell crank 54 rotates around the spring pin 52. The roller 58 consists of a pair of disks provided on either side of each bell crank 54. Therefore, the axial dimension (thickness) of the inner member 30 is selected to be slightly greater than the combined thickness of the bell crank 54 and the two disks of the roller 58.

A slot 38 is formed in a part of the inner member 30 adjoining each cutout 36 for retaining a spring retaining member 60. The spring retaining member 60 is configured to retain a hook-shaped end 62A of the tension coil spring 62. The second arm section 54C of the bell crank 54 is provided with a spring engaging feature 64 consisting of a plurality of notches for engaging the hook shaped other end 62B of the tension coil spring 62.

Figure 2:
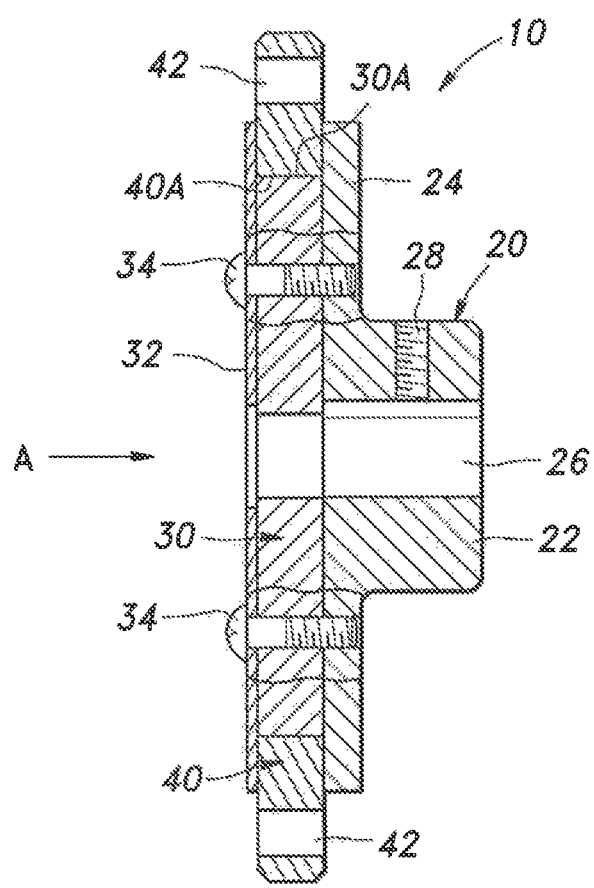
FIG. 2 is a sectional view taken along line II-II of FIG. 1.

Each tension coil spring 62 extends in the corresponding chamber 50 between the inner member 30 and the bell crank 54 substantially in parallel to the first arm section 54B of the corresponding bell crank 54, and is installed between the inner member 30 and the bell crank 54 under a prescribed preloading so that the corresponding bell crank 54 is urged in the clockwise direction in FIG. 1 or in the direction to engage the roller 58 in the engagement recess 44.

The assemblies each consisting of the corresponding engagement recess 44, the bell crank 54 and the tension coil spring 62 are positioned at rotationally symmetric positions or at positioned that are angularly displaced from each other by 180 degrees about the central axial line of the inner member 30 and the outer annular member 40 owing to the rotationally symmetric positioning of the two chambers 50. Therefore, the spring retaining member 60 and the spring engaging feature 64 in one of the chambers 50 are angularly displaced from the counterparts in the other chamber 50. As a result, the tension coil springs 62 in the different chambers 50 extend in parallel to each other on either side of the axial center line of the inner member 30 and the outer annular member 40. Owing to this parallel positioning of the two tension coil springs 62, space efficiency is enhanced, and the size of the torque limiter 10 can be minimized as compared to the case where the two tension coil springs 62 are not positioned in parallel to each other.

Each spring engaging feature 64 includes a plurality of notches arranged along the extending direction (lengthwise direction) of the second arm section 54C. The other end 62B of the corresponding tension coil spring 62 can be engaged by a selected one of the notches of the spring engaging feature 64.

Each chamber 50 may be filled with lubricant such as grease to minimize friction between the outer annular member 40 and the roller 58.

The mode of operation of the torque limiter 10 is described in the following. In this case, it is assumed that a shaft member (not shown in the drawings) fitted into the shaft receiving bore 26 of the hub member 20 is a torque source or a drive end, and a member (not shown in the drawings) connected to the outer annular member 40 is a torque user or a driven end.

When the hub member 20 is rotated in the clockwise direction in FIG. 1 (normal rotation), the torque (positive torque) which is transmitted from the hub member 20 to the outer annular member 40 pushes the roller 58 against the moderate slope 44A of the engagement recess 44. The transmitted torque causes the roller 58 to be pushed against the moderate slope 44A of the engagement recess 44, and a certain component of this force urges the bell crank 54 in the counterclockwise direction in FIG. 1. When the transmitted positive torque is below the prescribed torque value, this force component is smaller than the spring force of the tension coil spring 62 so that the roller 58 is kept engaged by the engagement recess 44 under the spring force of the tension coil spring 62, and the hub member 20 and the outer annular member 40 rotate in a single body without relative rotation. Therefore, the rotation of the hub member 20 is transmitted to the outer annular member 40 via the bell crank 54 and the roller 58.

As the positive torque applied to the hub member 20 increases, the force by which the roller 58 is pushed against the moderate slope 44A of the engagement recess 44 increases, and the component of the force that urges the bell crank 54 in the counterclockwise direction in FIG. 1 against the spring force of the tension coil spring 62 increases in a corresponding manner. As the positive torque applied to the hub member 20 approaches the prescribed torque value, the bell crank 54 is caused to rotate in the counterclockwise direction in FIG. 1 against the spring force of the tension coil spring 62, and the roller 58 rolls on the moderate slope 44A toward the inner circumferential surface 40A so that the rotation of the outer annular member 40 is delayed with respect to the rotation of the hub member 20, and a relative rotation between the hub member 20 and the outer annular member 40 occurs. As a result, the transmission of torque from the hub member 20 to the outer annular member 40 diminishes owing to this relative rotation.

As the positive torque applied to the hub member 20 is increased even further until the prescribed torque value is reached, the component of the force that urges the bell crank 54 in the counterclockwise direction in FIG. 1 against the spring force of the tension coil spring 62 increases even further until the roller 58 is completely disengaged from the engagement recess 44, and on account of the bell crank 54 rotating in the counterclockwise direction in FIG. 1 against the spring force of the tension coil spring 62, rolls over the inner circumferential surface 40A of the outer annular member 40. As a result, the transmission of torque from the hub member 20 to the outer annular member 40 ceases.

When the hub member 20 is rotatively driven in the counterclockwise direction in FIG. 1 (reverse rotation), the torque (reverse torque) that is transmitted from the hub member 20 to the outer annular member 40 causes the roller 58 to be pushed against the steep slope 44B of the engagement recess 44, and an action similar to that obtained in the case of normal torque transmission is obtained as the reverse torque increases. In the case of reverse torque, because the roller 58 is required to ride over the steep slope 44B of the engagement recess 44, although the tension spring force acting on the bell crank 54 is the same as in the case of normal torque, the prescribed torque value in this case is greater that in the case of normal torque.

The prescribed torque value of the torque limiter 10 is determined not only by the preloading of the tension coil spring 62 and the configuration of the engagement recess 44 but also by the lever ratio (the ratio of the arm lengths of the first arm section 54B and the second arm section 54C) of the bell crank 54 which provides a lever action, the bend angle of the bell crank 54 and the selection of the notch in the spring engaging feature 64 that engages the other end 62B of the tension coil spring 62 so that the freedom in selecting the prescribed torque value is enhanced. As a result, the range of the prescribed torque value of the torque limiter 10 of a given size can be greatly increased, and the torque limiter 10 can be designed as a compact unit even when the prescribed torque value is high.

The bell crank 54 provides not only the lever action but also the action to change the direction of the applied force so that the freedom in positioning the tension coil spring 62 can be enhanced by suitably adjusting the bend angle of the bell crank 54, and the freedom in designing the torque limiter 10 as a compact unit is also enhanced. In other words, the torque limiter 10 can be designed as a compact unit even when the prescribed torque value is high.

The disengagement of the end of the bell crank 54 from the engagement recess 44 occurs via the rotation (rolling) of the roller 58 so that it can be achieved in a highly smooth and reliable manner without the risk of getting caught or involving any instability.

Because the assembly consisting of the engagement recess 44, the bell crank 54, the roller 58 and the tension coil spring 62 is positioned in each of the two rotationally symmetric positions about the common rotational center line of the hub member 20, the inner member 30 and the outer annular member 40, no radially offset loading is applied to the torque limiter 10, and an uneven wear in the rotation supporting parts can be avoided. According to the arrangement of the foregoing embodiment, the two tension coil springs 62 extend in parallel to each other on either side of the central part of the inner member 30 so that two tension coil springs 62 having a substantial length can be positioned within the inner member 30 in a highly compact manner. This also increases the freedom in designing the torque limiter 10 as a compact unit.

The first rotatable member consisting of the outer annular member 40 and the second rotatable member consisting of the combination of the hub member 20 and the disk-shaped inner member 30 are joined together in a freely rotatable manner relative to each other but immobile relative to each other in the axial direction by interposing the outer annular member 40 between the flange 24 of the hub member 20 and the end plate 32 attached to the hub member 20 on the other side of the inner member 30 in the axial direction while the outer annular member 40 is rotatable relative to the inner member 30 via a bearing (rotational guide) provided by the outer peripheral part of the inner member 30. Thus, the overall structure is simplified while a reliable operation is ensured.

The present invention has been described in terms of a specific embodiment, but the present invention is not limited by the illustrated embodiment, and can be changed in various parts thereof without departing from the spirit of the present invention as can be readily appreciated by a person skilled in the art. For instance, a linear lever member may also be used in place of the bell crank 54. The engagement recess 44 may be symmetric in shape with respect to the advance side and the delay side of the rotation.

The number of the assemblies each consisting of the engagement recess 44, the bell crank 54, the roller 58 and the tension coil spring 62 is not limited to two, but may also be any number such as one, three and more than three.

The various components included in the illustrated embodiment are not necessarily essential for the present invention, and may be omitted and substituted without departing from the spirit of the present invention. For instance, the roller 58 is not essential for the present invention, and an end of the bell crank 54 may be directly engaged by the engagement recess 44.

The contents of the original Japanese patent application (JP2013-240758 filed on Nov. 21, 2013) on which the Paris Convention priority claim is made for the present application are incorporated in this application by reference.

GLOSSARY OF TERMS

10 torque limiter
20 hub member (second rotatable member)
30 inner member (second rotatable member)
32 end plate
36 cutout
40 outer annular member (first rotatable member)
44 engagement recess
44A moderate slope
44B steep slope
50 chamber
54 bell crank (lever member)
58 roller
62 tension coil spring (tension spring)
64 spring engaging feature

The invention claimed is:
1. A device including a first rotatable member, a second rotatable member, and a torque limiter for transmitting a torque of a limited value between the first rotatable member and the second rotatable member, the first and second rotatable members being disposed on a common central axial line, the torque limiter comprising:
   an engagement recess formed in an inner peripheral part of the first rotatable member;
   a lever member having an intermediate part pivotally attached to the second rotatable member about a rotational center line extending in parallel with the central axial line of the second rotatable member and one end configured to selectively engage the engagement recess; and
   a tension spring having an end engaged by the second rotatable member and another end engaged by another end of the lever member, the tension spring urging the lever member in a direction to cause the one end of the lever member to engage the engagement recess;
   wherein the lever member consists of a bell crank,
   wherein the lever member is provided with a first arm section extending from the intermediate part in a substantially tangential direction of the first rotatable member and including the one end of the lever member and a second arm section extending from the intermediate part substantially in a radial direction of the outer annular member and including the other end of the lever member,
   wherein the tension spring extends substantially in parallel to the first arm section of the lever member, and
   wherein the tension spring is disposed between the lever member and the central axial line of the first and second rotatable members.

2. The device according to claim 1, wherein a roller is provided on the one end of the lever member in a rotatable manner about an axial line parallel to the central axial line of the second rotatable member so that the one end of the lever member may be selectively engaged by the engagement recess via the roller.

3. The device according to claim 1, wherein a slope of the engagement recess on one circumferential side is steeper than a slope of the engagement recess on another circumferential side.

4. The device according to claim 1, wherein an assembly consisting of the engagement recess, the lever member and the tension spring is provided in each of a plurality of rotationally symmetric positions about the central axial line of the first and second rotatable members.

5. The device according to claim 4, wherein the assembly is provided in each of two rotationally symmetric positions about the central axial line of the first and second rotatable members, and the tension springs of the two assemblies extend in parallel to each other on either side of the axial center line of the first and second rotatable members.

6. The device according to claim 1, wherein the second arm section of the lever member is provided with a spring engaging feature for engaging the other end of the tension spring, the spring engaging feature including a plurality of spring engagement portions arranged along a lengthwise direction of the lever member so that the other end of the tension spring may be engaged to a selected one of the spring engagement portions.

7. A device including a first rotatable member, a second rotatable member, and a torque limiter for transmitting a torque of a limited value between the first rotatable member and the second rotatable member, the first and second rotatable members being disposed on a common central axial line, the torque limiter comprising;

an engagement recess formed in an inner peripheral part of the first rotatable member;

a lever member having an intermediate part pivotally attached to the second rotatable member about a rotational center line extending in parallel with the central axial line of the second rotatable member and one end configured to selectively engage the engagement recess; and a tension spring having an end engaged by the second rotatable member and another end engaged by another end of the lever member, the tension spring urging the lever member in a direction to cause the on of the lever member to engage the engagement recess;

wherein the lever member consists of a bell crank, wherein the first rotatable member comprises an outer annular member, and the second rotatable member comprises an assembly of a hub member and a disk-shaped inner member, and the outer annular member is interposed between the hub member and an end plate attached to the hub member on an opposite side of the inner member so that the outer annular member is rotatable relative to the inner member via a rotational guide defined by an outer peripheral part of the inner member.

* * * * *